US006622463B1

United States Patent
Anstey et al.

(10) Patent No.: US 6,622,463 B1
(45) Date of Patent: Sep. 23, 2003

(54) DEVICE FOR FOLDING LEADING END OF NET-TYPE BALE WRAPPING MATERIAL TO ENHANCE ITS FULL-WIDTH CONVEYANCE INTO THE BALING CHAMBER

(75) Inventors: Henry Dennis Anstey, Ottumwa, IA (US); Kenneth Craig Phillips, Ottumwa, IA (US); Jean Viaud, Gray (FR)

(73) Assignee: Deere & Company, Moline, IN (US)

( * ) Notice: Subject to any disclaimer, the term of this patent is extended or adjusted under 35 U.S.C. 154(b) by 118 days.

(21) Appl. No.: 09/452,072

(22) Filed: Nov. 30, 1999

(51) Int. Cl.[7] .................................................. B65B 11/56
(52) U.S. Cl. ............................ 53/587; 53/118; 53/211; 53/389.4; 53/441; 53/556
(58) Field of Search .................. 53/118, 211, 215, 53/389.4, 441, 556, 587

(56) References Cited

U.S. PATENT DOCUMENTS

| | | | | |
|---|---|---|---|---|
| 4,787,193 A | * | 11/1988 | Verhulst et al. ............... | 53/118 |
| 4,790,125 A | * | 12/1988 | Merritt, III ................... | 53/587 |
| 4,917,008 A | * | 4/1990 | Van Den Wilenberg ........ | 100/5 |
| 5,104,714 A | * | 4/1992 | Leiber et al. ................ | 428/131 |
| 5,181,368 A | * | 1/1993 | Anstey et al. ................ | 53/587 |
| 5,319,899 A | * | 6/1994 | Jennings et al. ............. | 53/118 |
| 5,433,059 A | * | 7/1995 | Kluver et al. ................ | 53/399 |
| 5,447,221 A | * | 9/1995 | Winski ................... | 198/468.11 |
| 5,687,548 A | * | 11/1997 | McClure et al. ............. | 53/399 |
| 5,692,365 A | * | 12/1997 | Meyer et al. ................ | 53/587 |
| 5,729,953 A | * | 3/1998 | Fell et al. .................... | 53/118 |
| 5,822,967 A | * | 10/1998 | Hood et al. .................. | 56/341 |
| 5,909,786 A | * | 6/1999 | Anthony .................... | 19/41 |
| 5,974,764 A | * | 11/1999 | Anstey et al. ............... | 53/118 |
| 5,979,141 A | * | 11/1999 | Phillips ..................... | 53/389.2 |
| 6,006,504 A | * | 12/1999 | Myers et al. ................ | 53/556 |

* cited by examiner

Primary Examiner—Rinaldi I. Rada
Assistant Examiner—Hemant M. Desai

(57) ABSTRACT

A large round baler is equipped with a net wrap feeding mechanism mounted to the rear and bottom of the bale discharge gate. The feeding mechanism includes upper and lower feed rolls, with the lower roll being located closer to the discharge gate than the lower roll and, the pair of rolls thus being arranged to deliver wrapping material against an upright run of bale forming belts, the latter acting to carry the net to a pinch point formed between the belts, where they pass around a lower rear belt support roll, and a guide pan of a net material guide assembly that extends beneath and adjacent a lower run of the belts. A net wrap material cut-off device includes a fixed knife blade located forwardly of and extending parallel to the lower feed roll. The cut-off device further includes a pair of transversely spaced cut-off arms between which extend and to which are fixed an anvil. The arms are mounted for pivoting between a raised standby position, wherein the anvil is located adjacent the upper feed roll and a lowered cut-off position, wherein the anvil is engaged with the knife blade. A row of bristles is located between the lower feed roll and the knife blade at a position where it acts to strip the lower roll of net material having a tendency to wrap about the lower roll and to entangle the net material as the latter is brought against the bristles during severing of the net material tensioned between the feed rolls and the pinch point after a bale has been wrapped. The entangled net material results in the leading end of the net material becoming folded back on itself at the beginning of the next wrapping cycle, such doubling together with the operation of spreader rolls acting to deliver the net material to the baling chamber at its full width.

9 Claims, 3 Drawing Sheets

DEVICE FOR FOLDING LEADING END OF NET-TYPE BALE WRAPPING MATERIAL TO ENHANCE ITS FULL-WIDTH CONVEYANCE INTO THE BALING CHAMBER

BACKGROUND OF THE INVENTION

The present invention relates to bale wrapping mechanisms for large round balers and more specifically relates to apparatus for conveying net material at its full-width into the baling chamber of a large roll strippers for preventing the wrapping material from wrapping about the wrap material feed rolls.

It is known to wrap large cylindrical bales formed in the baling chamber of a so-called large round baler with net material that is either the same width as the baling chamber or with net material that is wider than the baling chamber with the baler being designed to accept the extra width in a manner that results in the net material being folded over the ends of the bale. In either case it is desirable for the net to be at its full width when it enters the baling chamber, the net being of a knitted construction that results in it having a tendency to become narrower when under tension, as when being wrapped about a bale. In an attempt to keep the net material at its full width, it is known to use wrap material guide or conveying rolls having spiral flighting for engaging and spreading and/or maintaining the net material at its full width. Examples of such spreader rolls or devices are disclosed in U.S. Pat. No. 4,787,193 issued to Verhulst et al. on Nov. 29, 1988 and in U.S. patent application Ser. No. 09/008,515 filed by Myers et al. on Jan. 16, 1998 and having the same assignee as the present application. While these net material spreader devices normally operate in a satisfactory manner, there are still times when the material is not completely spread to its full width when entering the baling chamber. Also, the leading end of knitted net material has many exposed strand ends which may become wrapped about the net material spreader devices or rolls.

SUMMARY OF THE INVENTION

According to the present invention, there is provided a device for improving the feeding of net type bale wrapping material into the bale forming chamber of a large round baler.

An object of the invention is to provide a device which enhances the operation of net wrap material spreader rolls by creating a folded leading end portion in the net material prior to its engagement with a spreader roll assembly.

A more specific object of the invention is to provide a structure for holding the end of the tail section of net wrap material located at the outlet side of the pair of wrap material feed rolls during the operation of the net material being cut-off from a wrapped bale, the held end resulting in the net becoming folded back on itself until the folded net end portion reaches a conveyor pinch point which pulls the held end loose.

Still a more specific object of the invention is to provide a structure, as set forth in the immediately preceding object, which includes a row of bristles so located relative to the cut-off device that the free end of the tail section of the net wrap material becomes entangled in the bristles during severing of the tail section from a length of the material wrapped about a bale.

Yet a more specific object of the invention is to provide a row of bristles, as set forth in the immediately preceding object, which are located in such relationship to the lower wrap material feed roll that it acts to strip or prevent the wrap material from becoming wrapped about this feed roll.

These and other objects of the invention will become apparent from a reading of the ensuing description together with the appended drawings.

DESCRIPTION OF THE PREFERRED EMBODIMENT

Preliminarily, it is to be noted that various components may be described as existing in pairs while only one of each pair is shown and it is to be understood that the absent component is the same as, or similar in construction to, the one shown. Further, the terms "right-hand" and "left-hand" are made with reference to the view point of an observer standing behind and facing in the forward direction of travel of the implement being described.

Figure 1:
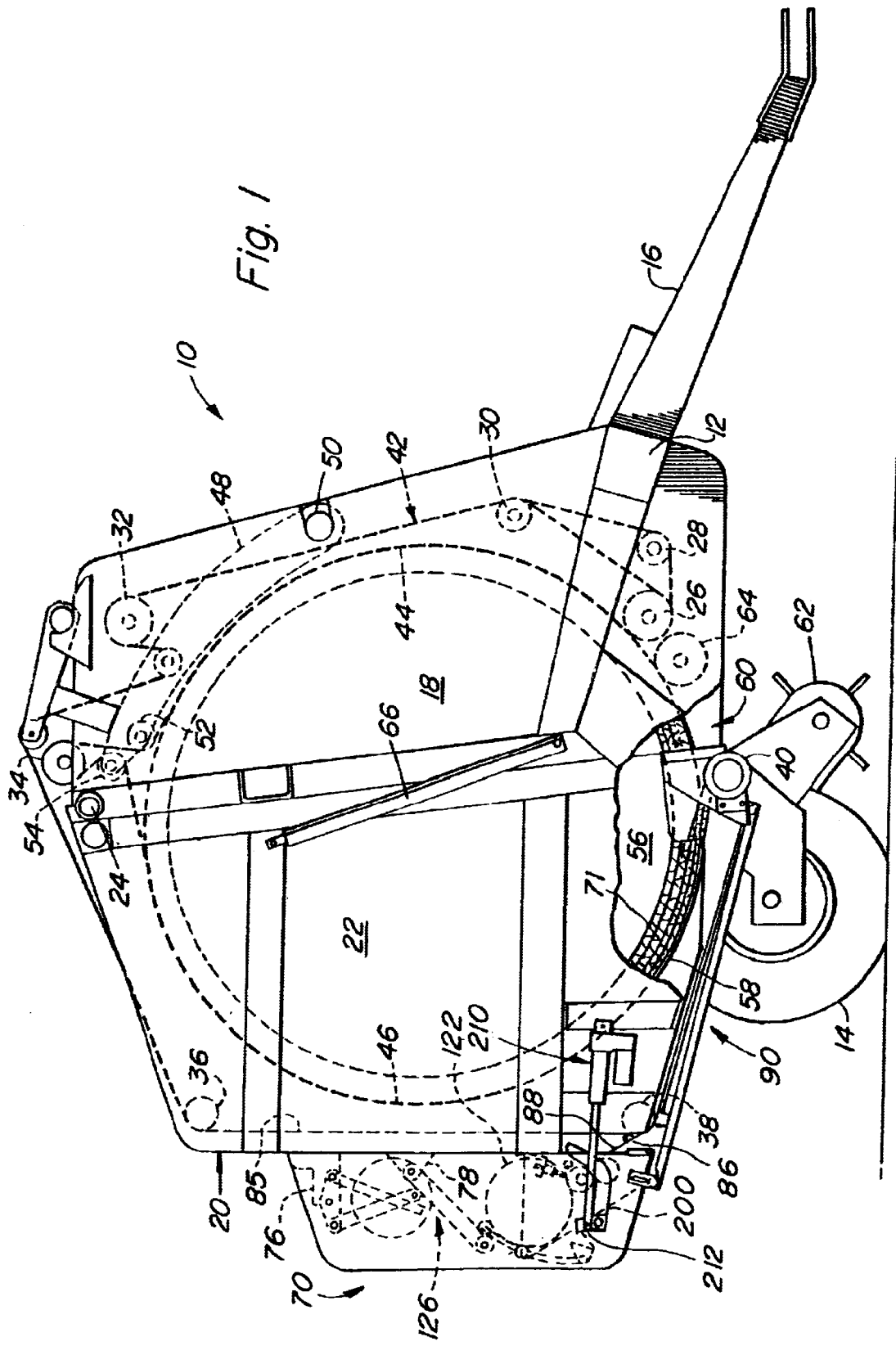
FIG. 1 is a right side elevational view of a large round baler equipped with a net wrapping assembly with which the net end entangling structure of the present invention is particularly adapted for use.

Referring now to FIG. 1, there is shown a baler 10 of the type for making large cylindrical bales and commonly called a large round baler. The baler 10 comprises a main frame 12 supported on a pair of ground wheels 14. The frame 12 has a draft tongue 16 secured thereto and adapted for being connected for towing by a prime mover such as an agricultural tractor, not shown. A pair of transversely spaced, vertical side walls 18 are joined to the frame 12 and have respective upright rear ends. A bale discharge gate 20, including opposite side walls 22, is vertically pivotally attached, as at 24, to upper rear locations of the side walls 18, the side walls 22 having upright forward ends which abut the rearward ends of the side walls 18 when the gate 20 is in a lowered closed position, as shown.

Arranged about the periphery of, and extending between the side walls 18 and 22, are a plurality of bale-forming belt support rolls having their opposite ends rotatably supported in bearings, not shown, carried by the side walls. Specifically, beginning at a lower central location of, and proceeding counterclockwise to an upper rear location of the side walls 18, there are mounted a driven roll 26, a lower front roll 28, an intermediate front roll 30, an upper front roll 32, and an upper rear roll 34. Continuing counterclockwise from an upper rear location of the gate side walls 22, there is mounted an upper rear roll 36, a lower rear roll 38 and a lower front roll 40. Located between the pairs of side walls 18 and 22 and supported in side-by-side relationship to one another across the various belt support rolls are a plurality of endless bale-forming belts 42. Except for some of the belts 42 which skip the lower front roll 28, the belts 42 are trained so that they serially engage the rolls 26, 28, 30, 32, 36, 38, 40 and 34. A front run 44 of the belts 42 extends upwardly from the driven roll 26 to the roll 34. Similarly, a rear run 46 of the belts 42 extends upwardly from the lower front gate roll 40 to the roll 34. Mounted between rear end locations of a pair of rearwardly extending tensioning arms 48, which are vertically pivotally mounted, as at 50, to a mid-height location at the front of the side walls 18, are closely spaced, front and rear idler rolls 52 and 54, with the belt runs 44 and 46 cooperating with the side walls 18 and 22 to define an expansible baling or bale-forming chamber 56, closed at its top by the idler rolls 52 and 54, and here shown in a state of considerable expansion and containing a bale 58. When the chamber 56 is empty, the front and rear belt runs 44 and 46, respectively, converge upwardly from the drive roll 26 and lower front gate roll 40 and pass closely to each other between the rolls 52 and 54, with the run 44 contacting a rear surface of the front roll 52 and with the run 46 contacting a forward surface of the rear roll 54, the chamber 56 thus being wedge-shaped as viewed from the side. The bottom of the chamber 56 is provided with a crop inlet 60 extending between the driven roll 26 and the lower front gate roll 40. Crop products are introduced into the inlet 60 by a pickup 62 for being rolled into a bale, such as the bale 58, by the action of the front and rear belt runs 44 and 46, which are respectively driven so as to travel toward and away from the inlet, and initially also by a starter roll 64 rotatably mounted in the side walls 18 adjacent to and being driven in the same direction as the driven roll 26 so that it operates to strip crop being carried downwardly by the front run of belts 44. As the bale 58 is being formed, the chamber 56 yieldably expands, to a predetermined size as shown, against the force established in the belts by a tensioning system including the pair of tensioning arms 48 together with a pair of tensioning springs (not shown) and a pair of hydraulic cylinders (not shown) coupled between the walls 18 and the arms 48 for resisting upward movement of the arms, in a manner well known in the art. A pair of gate cylinders 66 are provided for swinging the gate 20 upwardly, about the pivotal attachment 24, to an open position when it is desired to discharge the bale 58 onto the ground.

Figure 2:
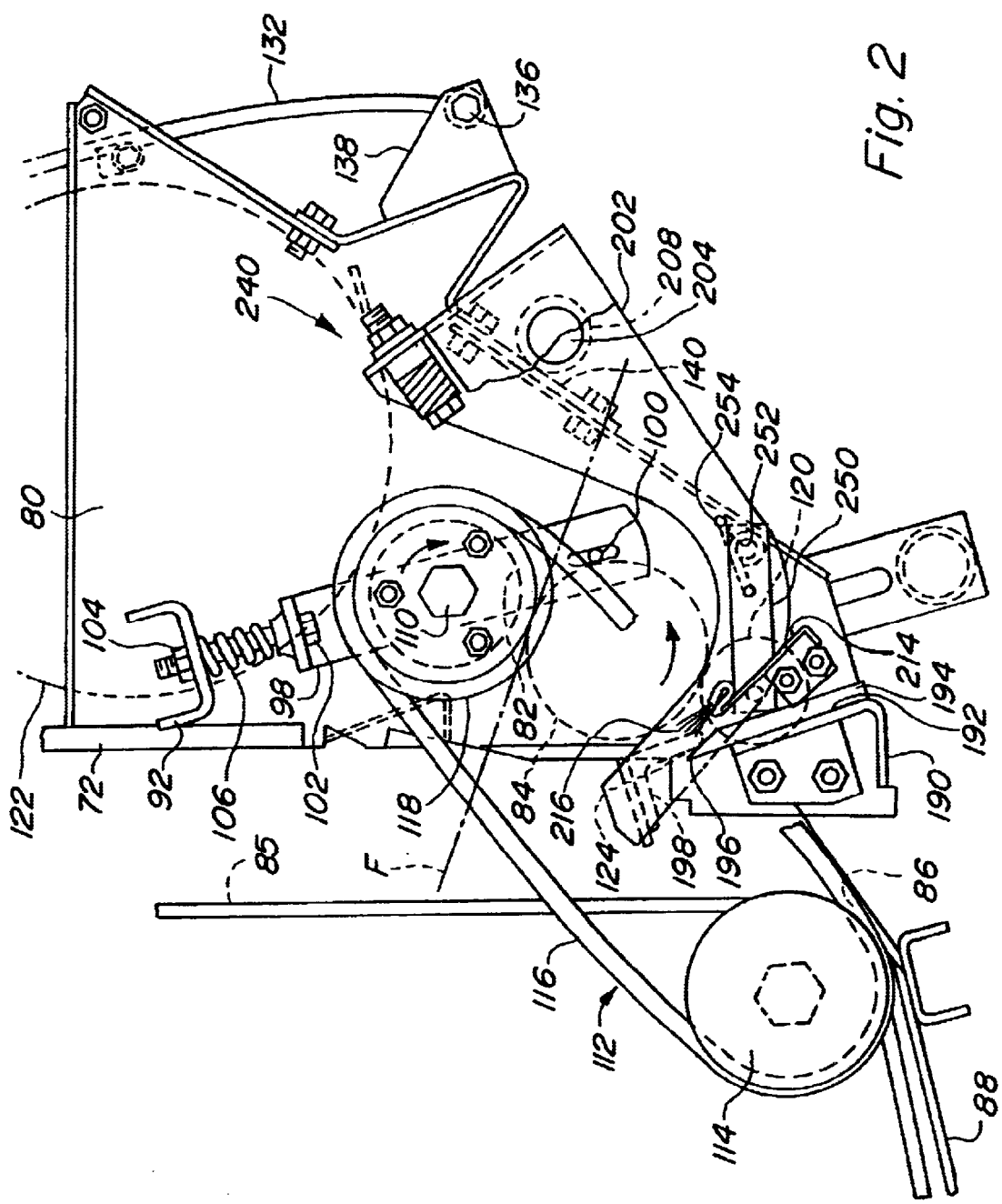
FIG. 2 is a left side elevational view of the net wrap material feed mechanism, with the mechanism cover removed for clarity, showing the cut-off device in its cut-off position.

Referring now also to FIG. 2, a web wrap dispensing or feed mechanism or apparatus 70 is shown mounted to a lower rear location of the discharge gate 20 for wrapping bales, such as the bale 58, formed in the baling chamber 56 prior to the bales being discharged onto the ground. It is to be noted that the apparatus 70 is designed for dispensing a web of net material having a width greater than the width of the baling chamber 56 for being fed into the baling chamber 56 in a such way, not discussed in detail, that the net material becomes wrapped over the end corners of the bale 58, as shown at 71 in FIG. 1. Specifically, the apparatus 70 includes a support structure, mounted to the rear, bottom half of the gate 20, comprising a transverse vertical panel 72 extending across and being fixed to vertical flanges respectively defining rear ends of the opposite side walls 22 of the gate. The panel 72 has an upper end which is defined by a downwardly and rearwardly extending flange (not shown). Bolted to upper right- and left-hand areas of the panel 72 beneath the flange are respective transverse legs of a pair of angular, crank arm support brackets 76. Spaced vertically below the pair of support brackets 76 and having transverse legs bolted to the panel 72 are a pair of angular, biasing arm support brackets 78. The support structure of the wrapping apparatus 70 further includes a pair of longitudinally extending, vertical support walls 80, which are approximately right-triangular in side view and have forward, vertical sides defined by transverse flanges that overlap a lower portion of the panel 72 and are secured, as by threaded fasteners, not shown, to structure at the rear of the gate 20 so as to be spaced transversely from each other by a distance greater than the distance between the gate side walls 22, i.e., greater than the width of the baling chamber 56.

Extending between and having their opposite ends rotatably mounted in bearings carried by the support walls 80 are upper and lower wrap material feed rolls 82 and 84, respectively, with the rotational axis of the roll 82 being disposed above and rearwardly of the axis of the roll 84 such that a planar wrap material flight path F is disposed tangentially to the rolls at their bite or nip, and extends upwardly and forwardly from the nip and below the panel 72. As can be seen in FIG. 2, the material flight path F intersects a vertical run 85 of the belts 42 extending between the upper and lower support rolls 36 and 38, respectively, at a location above a nip or bite 86 defined by a net material guide pan portion 88, forming part of a wrap material guide assembly 90, and a portion of the belts 42 engaged with the lower rear support roll 38.

The upper net feed roll 82 is preferably constructed of a metal core covered with a high-friction rubber. The roll 82 is mounted so as to be biased against the lower net feed roll 84 so that the latter is driven by frictional engagement with the former. Specifically, fixed to the outer surface of each of the walls 80 is a transversely extending u-shaped bracket 92. Located below, and having an out-turned upper end disposed parallel to, each of the brackets 92 is a quill mounting strap 98 containing an elongated slot in which is received a guide pin or bolt 100 which is fixed to the adjacent wall 80. A pair of bolts 102 respectively project upwardly through the pair of out-turned ends of the quill mounting straps 98 and through the adjacent bracket 92, and each are held in an adjusted position by a nut 104 received on a threaded upper end thereof. A coil spring 106 is located on each bolt 102 and is loaded between the associated bracket 92 and quill mounting strap 98. Projecting through a central location along the length of each of the straps 98 and through a circular clearance opening (not shown) provided in the adjacent wall 80, is a feed roll mounting bolt 110 that serves to rotatably mount the feed roll 82 to a quill carried by the strap 98, with movement of the roll toward and away from the lower roll 84 being permitted by the respective slots in the lower portions of the straps 98.

Figure 3:
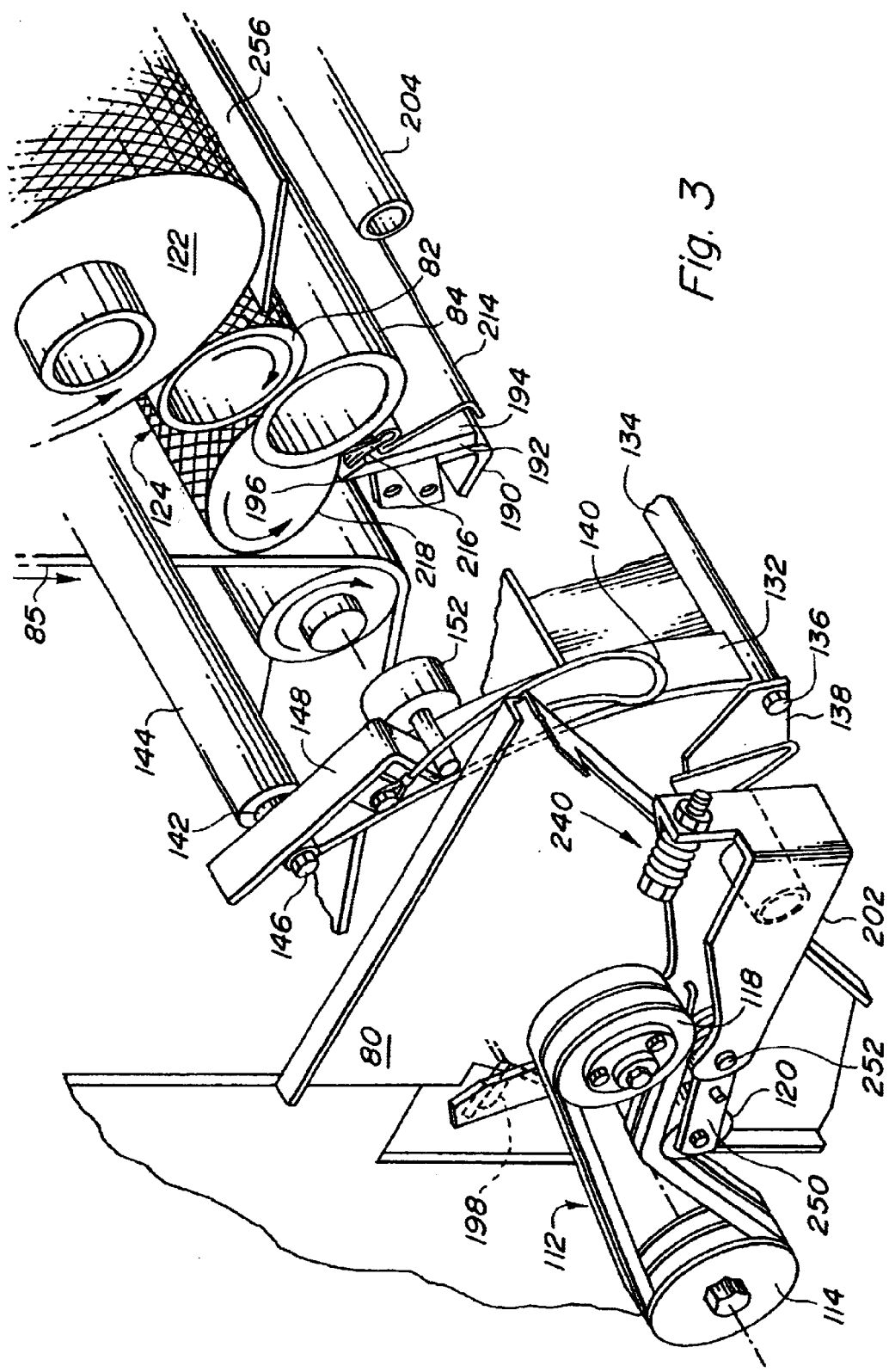
FIG. 3 is a left rear perspective view of the net wrap feed mechanism in a condition at the initiation of a wrapping cycle with the end of the tail section of the net material entangled with the row of bristles and the wrap material folded back on itself.

As shown in FIGS. 2 and 3, a variable speed pulley and belt arrangement 112 is provided for driving the upper net feed roll 82 in a clockwise direction, with the consequence that, due to its frictional engagement with the roll 82 the lower feed roll 84 is driven counterclockwise, as indicated by the arrows. The drive arrangement 112 includes a double belt groove pulley 114 mounted to a shaft coupled as an extension of the lower rear baleforming belt support roll 38 so that there is always a direct, but selectively variable, relationship between the speed of the bale-forming belts 42 and the peripheral speed of the wrap material feed rolls 82 and 84. A pair of v-belts 116 are coupled between the pulley 114 and a variable speed pulley 118 coupled to a leftward extension of the support shaft of the upper net feed roll 82. It is noted that the pulley 118 is of a known construction which may be disassembled so as to permit shims to be added or removed for adjusting the width of grooves receiving the belts 116, the addition of shims resulting in wider grooves with the consequence that the belts ride at a smaller diameter thereby increasing the speed, and the removal of shims resulting in narrower grooves with the consequence that the belts ride at a larger diameter, thereby decreasing the speed. An idler pulley 120 is mounted, in a manner described below, for selectively being moved into engagement with lower runs of the belts 116 to tension them so as to effect a drive connection between the pulleys 114 and 118 when it is desired that net material be fed to the baling chamber for wrapping a bale.

An active net material supply roll 122 is shown positioned directly in contact with the driven upper feed roll 82. A length of net material 124 extends from a lower forward location of the supply roll 122 about the rearward half of the upper feed roll 82 and then through the nip or bite of the feed rolls 82 and 84. During the wrapping of a bale located in the baling chamber 56, the length of net material 124 continues on from the feed rolls 82 and 84 and engages a portion of an upper forward quadrant of the lower feed roll 84 and extends into the nip 86 defined by the bale forming belts 42 and the pan 88 of the material guide assembly 90. As is discussed in more detail below, FIGS. 2 and 3 respectively show the length of material 124 as it would appear after being severed or cut-off at a location between the feed rolls 82 and 84 and the nip 86, and at the initiation of the wrapping cycle.

A pressure arm assembly 126 is provided for applying a near constant force to the active net material supply roll 122 for urging it against the upper feed roll 82 so as to establish a desired frictional resistance to the force tending to pull the net from the roll during wrapping of a bale. The arm assembly 126 is defined by upper and lower separate arm sections, of which only the lower arm section 128 is shown and described in detail. Specifically, the lower arm section 128 includes a pair of transversely spaced lower arm portions 132 having first ends welded to a transverse rod 134, the arm portions being mounted for swinging vertically about a horizontal transverse pivot axis defined by respective pins 136 coupling opposite ends of the rod 134 to respective brackets 138 fixed to the rear sides of the support walls 80. The arm portions 132 are constructed from straps or narrow plates which are slightly bowed or curved such that they are upwardly concave for cradling a new roll of wrap material when the lower arm section 128 is in a lowered, rearwardly extending loading position, in which it is held by a pair of flexible members, here shown as cables 140. Welded to the free end of each arm portion 132 is a tubular sleeve 142. A pressure roller 144 extends between and is mounted for rotation within the sleeves 142 by respective bearing assemblies including bolts 146. The pressure roller 144 engages the periphery of the supply roll 122 at a location approximately diametrically opposite from the zone of contact of the roll 122 with the upper net wrap feed roll 82. An L-shaped force transfer plate 148 is welded to each arm portion 132 so as to form an extension thereof, with the long leg of the L having an approximate middle location thereof welded to the sleeve 142 and with the short leg of the L having its end welded to the arm portion 132. A roller mounting pin 150 is welded transversely across each arm portion 132 at the juncture of the short leg of the force transfer plate 148 with the arm portion. Each mounting pin 150 extends inwardly beyond its associated arm portion 132 and there receives a catch roller 152 located adjacent a peripheral region of the supply roll 122 so as to prevent the latter from moving rearwardly during operation of the baler 10. Omitted here for the sake of brevity is the description of the upper arm section, suffice it to say that it is coupled to a biasing force and includes rolls that are engaged with the pressure transfer plates 148 so that the biasing force is transferred to the pressure roller 144 and from there to the roll of wrap material 122.

Fixed to a lower rear location of the discharge gate 20 just below and forwardly of the lower net feed roll 84 is an angular knife support bracket 190 that defines a near vertical knife mounting surface 192 that extends transversely between the support walls 80. Mounted to the surface 192 is a cut-off knife 194 having a beveled upper end forming a cutting edge 196. An anvil 198 is constructed from a length of angle iron and extends in parallel relationship to the cutting edge 196 and forms part of a cut-off arm assembly for being selectively moved from a stand-by position, wherein it is elevated above the cutting edge 196 to a location just above the wrap material path F so as to leave a clear path to the belt runs 85 at the beginning of a wrapping cycle, to a cut-off position wherein one of the angle member legs engages the beveled surface leading up to the cutting edge 196, as shown in FIG. 2. Specifically, the cut-off arm assembly includes right- and left-hand, fore-and-aft extending, transversely spaced arms 200 and 202, respectively, having forward ends joined together by the anvil 198. The arms 200 and 202 are joined at their rear ends by a rock shaft 204 that is received for pivoting in a pair of cylindrical sleeves forming respective parts of a pair of mounting structures 208 respectively fixed to rear sides of the support walls 80. As can be seen in FIG. 1, an electrically driven, reversible linear actuator 210 is mounted to the right-hand side wall 22 of the discharge gate 20 and has an output shaft coupled to a crank arm 212 fixed to the outer end of the rock shaft 204. The output shaft of the actuator 210 is in an extended condition when the anvil 198 is in its raised standby position. After a bale is wrapped with net, in a manner to be described, the actuator 210 is caused to contract its output shaft. This causes the cut-off arm assembly 200, 202, 204 to be swung counterclockwise, as viewed in FIG. 2, resulting in the anvil 198 moving to its lowered cut-off position, and along the way engaging the length of net 124 and bringing it down into contact with the knife cutting edge 196 where it is cut off. A clean or efficient cutting of the length of net 124 is effected by the bale 58 continuing to rotate so as to tension the length of net while at the same time disconnecting the drive to, and braking, the material feed roll 82, the braking being in response to downward movement of the cut-off arm assembly 200, 202 and 204. Specifically, mounted to the rear of the arm 202 is an adjustable abutment 240. The idler pulley 120 is carried at the end of a idler arm 250 which is pivotally mounted to the arm 202, as at pin 252, and biased upwardly by a torsion spring arrangement 254. Downward movement of the arm assembly then results in the tension in the belts 116 being removed while bringing the adjustable abutment 240 into engagement with a brake pad (not shown) for pivoting the pad, at its mounting with a manually operable arm (not shown) into braking engagement with the belts 116.

Located between the lower wrap material feed roll 84 and the knife edge 196 is a brush 214 having bristles 216 extending coextensive with and positioned adjacent to the feed roll 84 and the beveled surface of the knife 194 leading to the cutting edge 196. The brush 214 performs two functions. One is to act as a stripper which prevents the length of net 124 from wrapping about the feed roll 84 at the beginning of the wrapping cycle, and the other is to act to entangle the free end of the tail section of the length of net material 124 as the material is being cut off at a location between the feed rolls 82 and 84, and the nip 86 by the action of the anvil 198 working against the knife 194. The purpose of entangling the length of net 124 is so that at the beginning of the next wrapping cycle the length of net 124 will become folded back on itself, as shown at 218 in FIG. 3, resulting in a double layer of net that forms a leading edge which is free of loose strand ends being carried to the nip 86 by the bale forming belt runs 85 whereupon the entangled end is pulled loose. This double layer of net at the leading end of the length of wrap material 124 comes into engagement with a rear set of spreader roll sections (not shown) at the opposite ends of the belt support roll 38 which is located adjacent the nip. It has been found that the double layer of net results in an enhancement in the function of the rear spreader roll sections, and with a front set of spreader roll sections (not shown) at the opposite ends of the bale forming belt support roll 40, in spreading and/or maintaining the net material at full width so that proper wrapping of the bale occurs. Further, since the folded leading end of the length of wrap material is free of loose strand ends, the length of wrap material has a reduced tendency to become wrapped about the spreader rolls. The construction of the spreader rolls is shown in the above-identified patent application Ser. No. 09/008,515 and reference may be had to this application if the details of the spreader rolls is desired.

It is here noted that as far as the entangling feature of the brush 214 goes, the brush could be replaced by any holding device capable of lightly grasping the severed end portion of the length of net wrap material 124. For example, with a slight modification in geometry of the anvil 198, a toggle mechanism could be provided adjacent the upper end of the knife 194 which is tripped by operation of the anvil 198 so that a holding element thereof acts to hold the net material against the beveled upper end of the knife 194 with the tension in folded leading end portion of the net material acting to trip and reset the toggle device at the beginning of the next wrapping cycle.

What is claimed is:

1. In a net wrap material feeding mechanism mounted to an exterior location of a large round baler so as to be adjacent a bale forming chamber, the feeding mechanism including upper and lower feed rolls arranged for directing net wrap material along a flight path extending tangent to said feed rolls and toward the bale forming chamber, the improvement comprising: a net material holding device extending alongside said feed rolls at a location to one side of said flight path; a cut-off mechanism including a cut-off arm having a cut-off element moveable from a standby position, at an opposite side of the flight path from said net material holding device, to a cut-off position adjacent said net material holding device; and said cut-off element being so located relative to said net material holding device that, during operation in severing a length of net wrap material tensioned between the feed rolls and a wrapped bale located in the baling chamber, the cut-off element will engage and carry the net wrap material to said net material holding device where the net wrap material comes into engagement with, and is held by, said net material holding device at a location adjacent its severed end once severing is completed, thereby setting up a condition which results in a folded net material leading end portion being formed during the next wrapping cycle prior to the net material pulling free of said net material holding device.

2. The net wrap material feeding mechanism defined in claim 1 wherein said net material holding device is a row of bristles operable for entangling the web wrap material when brought into engagement with the bristles by said cut-off element.

3. The net wrap material feeding mechanism defined in claim 2 wherein said row of bristles is located sufficiently close to one of said upper and lower feed rolls as to act as a stripper for preventing net wrap material from becoming wrapped around said one of said upper and lower feed rolls.

4. The net wrap material feeding mechanism defined in claim 1 wherein said upper feed roll is located further away from said baling chamber than said lower feed roll and said net material holding device is located below said flight path.

5. The net wrap material feeding mechanism defined in claim 1 wherein said cut-off mechanism includes a knife blade extending alongside said feed rolls and having a beveled surface ending at a cutting edge spaced toward said baling chamber from said lower feed roll; and said cut-off element being an anvil located for engaging and trapping the wrap material against said beveled surface.

6. The net wrap material feeding mechanism defined in claim 5 wherein said net material holding device includes a row of bristles located sufficiently close to said lower feed roll that it serves as a stripper for preventing the net wrap material from becoming wrapped about said lower feed roll.

7. The net wrap material feeding mechanism defined in claim 6 wherein said row of bristles is located between said beveled surface of said knife blade and said lower feed roll.

8. In a net wrap material feeding mechanism for feeding wrapping material to a baling chamber of a large round baler for wrapping a bale formed there, the feeding mechanism including a pair of feed rolls mounted in frictional engagement with each other along respective lengths thereof for feeding wrap material along a flight path extending perpendicular to a line of centers of said pair of feed rolls and a wrap material stripper extending parallel to and located adjacent at least one of said pair of feed rolls, the improvement comprising: said wrap material stripper being in the form of a row of bristles.

9. The net wrap material feeding mechanism defined in claim 8 and further including a wrap material cut-off mechanism including an anvil and a cut-off knife; a cut-off arm assembly including a pair of transversely spaced arms mounted for pivoting about an axis extending parallel to said pair of feed rolls; one of said anvil and cut-off knife extending between and being fixed to said pair of transversely spaced arms for movement therewith between a standby position located on one side of said flight path and a cut-off position located on an opposite side of said flight path from said one side and into engagement with another of said anvil and cut-off knife; and said row of bristles being so located relative to said cut-off knife and said anvil that when said arm assembly moves from its standby to its cut-off position, during severing net material tensioned between said pair of feed rolls and the bale, the net will become entangled in said row of bristles.

* * * * *